(12) United States Patent
Rosmann et al.

(10) Patent No.: US 9,282,540 B2
(45) Date of Patent: *Mar. 8, 2016

(54) CHANNEL FREQUENCY REUSE FOR NARROW BEAM VIDEO STREAMING BASED UPON MOBILE TERMINAL LOCATION INFORMATION

(71) Applicant: Broadcom Corporation, Irvine, CA (US)

(72) Inventors: David Rosmann, Irvine, CA (US); Jeyhan Karaoguz, Irvine, CA (US); Sherman (Xuemin) Chen, Rancho Santa Fe, CA (US); Michael Dove, Los Gatos, CA (US); Thomas J. Quigley, Franklin, NC (US); Stephen E. Gordon, Lexington, KY (US)

(73) Assignee: Broadcom Corporation, Irvine, CA (US)

( * ) Notice: Subject to any disclaimer, the term of this patent is extended or adjusted under 35 U.S.C. 154(b) by 340 days.

This patent is subject to a terminal disclaimer.

(21) Appl. No.: 13/925,397

(22) Filed: Jun. 24, 2013

(65) Prior Publication Data

US 2013/0281103 A1 Oct. 24, 2013

Related U.S. Application Data

(63) Continuation of application No. 13/569,850, filed on Aug. 8, 2012, now Pat. No. 8,494,440, which is a continuation of application No. 12/056,905, filed on Mar. 27, 2008, now Pat. No. 8,265,638.

(51) Int. Cl.
| | | |
|---|---|---|
| *H04W 72/04* | (2009.01) | |
| *H04N 21/2385* | (2011.01) | |
| *H04N 21/414* | (2011.01) | |
| *H04N 21/61* | (2011.01) | |
| *H04W 16/02* | (2009.01) | |
| *H04W 16/28* | (2009.01) | |

(Continued)

(52) U.S. Cl.
CPC ............ *H04W 72/04* (2013.01); *H04N 21/2385* (2013.01); *H04N 21/41407* (2013.01); *H04N 21/6131* (2013.01); *H04N 21/6181* (2013.01); *H04W 72/048* (2013.01); *H04L 65/4084* (2013.01); *H04W 16/02* (2013.01); *H04W 16/28* (2013.01); *H04W 52/143* (2013.01)

(58) Field of Classification Search
CPC ... H04W 72/04; H04W 72/048; H04W 16/28; H04W 16/02; H04W 52/143; H04N 21/2385; H04N 21/6131; H04N 21/6181; H04N 21/41407; H04L 65/4084
USPC ............ 455/446, 447, 450–452.2, 456.1, 509
See application file for complete search history.

(56) References Cited

U.S. PATENT DOCUMENTS

| 5,455,821 | A | * | 10/1995 | Schaeffer | .............. | H04W 16/04 |
| | | | | | | 370/330 |
| 5,887,262 | A | * | 3/1999 | Willhoff | ............... | H04W 16/28 |
| | | | | | | 455/25 |
| 6,069,885 | A | * | 5/2000 | Fong | ..................... | H04W 16/06 |
| | | | | | | 370/336 |

(Continued)

*Primary Examiner* — Sharad Rampuria
(74) *Attorney, Agent, or Firm* — Garlick & Markison; Bruce E. Garlick (57) ABSTRACT

Transmitting signals to at least one wireless terminal by a wireless network having a channel frequency reuse pattern. A transceiving device within the wireless network selects a channel in contradistinction to the channel frequency reuse pattern to service transmission of a signal to the at least one wireless terminal.

20 Claims, 9 Drawing Sheets

(51) Int. Cl.
*H04W 52/14* (2009.01)
*H04L 29/06* (2006.01)

(56) References Cited

U.S. PATENT DOCUMENTS

| | | | | |
|---|---|---|---|---|
| 6,141,557 A * | 10/2000 | Dipiazza | ............... | H04W 16/12 455/446 |
| 6,497,599 B1 * | 12/2002 | Johnson | ................ | H04W 16/02 370/321 |
| 6,542,746 B1 * | 4/2003 | Dean | ....................... | H01Q 1/246 455/447 |
| 6,693,884 B1 * | 2/2004 | Gutowski | ............. | H04B 1/7097 370/335 |
| 7,200,407 B1 * | 4/2007 | Smith | .................... | H04W 72/06 455/447 |
| 8,265,638 B2 * | 9/2012 | Rosmann | ........... | H04N 21/2385 370/329 |
| 8,494,440 B2 * | 7/2013 | Rosmann et al. | ............ | 455/3.06 |
| 2004/0190482 A1 * | 9/2004 | Baum et al. | .................... | 370/347 |

* cited by examiner

CHANNEL FREQUENCY REUSE FOR NARROW BEAM VIDEO STREAMING BASED UPON MOBILE TERMINAL LOCATION INFORMATION

REFERENCE TO PRIORITY APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

U.S. Utility patent application Ser. No. 13/569,850, entitled "Channel Frequency Reuse for Narrow Beam Video Streaming Based Upon Mobile Terminal Location Information," filed Aug. 8, 2012, pending, which claims priority pursuant to 35 U.S.C. §120, as a continuation, to the following U.S. Utility Patent Application which is hereby incorporated herein by reference in its entirety and made part of the present U.S. Utility Patent Application for all purposes:

U.S. Utility application Ser. No. 12/056,905, entitled "Channel Frequency Reuse for Narrow Beam Video Streaming Based Upon Mobile Terminal Location Information," filed Mar. 27, 2008, now U.S. Pat. No. 8,265,638.

BACKGROUND

1. Technical Field

This present disclosure relates generally to video/audio content transport and more particularly to the transmission of such video/audio content in a wireless system.

2. Related Art

The broadcast of digitized video/audio information (multimedia content) is well known. Limited access communication networks such as cable television systems, satellite television systems, and direct broadcast television systems support delivery of digitized multimedia content via controlled transport medium. In the case of a cable modem system, a dedicated network that includes cable modem plant is carefully controlled by the cable system provider to ensure that the multimedia content is robustly delivered to subscribers' receivers. Likewise, with satellite television systems, dedicated wireless spectrum robustly carries the multi-media content to subscribers' receivers. Further, in direct broadcast television systems such as High Definition (HD) broadcast systems, dedicated wireless spectrum robustly delivers the multi-media content from a transmitting tower to receiving devices. Robust delivery, resulting in timely receipt of the multimedia content by a receiving device is critical for the quality of delivered video and audio.

Some of these limited access communication networks now support on-demand programming in which multimedia content is directed to one, or a relatively few number of receiving devices. The number of on-demand programs that can be serviced by each of these types of systems depends upon, among other things, the availability of data throughput between a multimedia source device and the one or more receiving devices. Generally, this on-demand programming is initiated by one or more subscribers and serviced only upon initiation.

Publicly accessible communication networks, e.g., Local Area Networks (LANs), Wireless Local Area Networks (WLANs), Wide Area Networks (WANs), Wireless Wide Area Networks (WWANs), and cellular telephone networks, have evolved to the point where they now are capable of providing data rates sufficient to service streamed multimedia content. The format of the streamed multimedia content is similar/same as that that is serviced by the limited access networks, e.g., cable networks, satellite networks. However, each of these communication networks is shared by many users that compete for available data throughput. Resultantly, streamed multimedia content is typically not given preferential treatment by these networks.

Generally, streamed multimedia content is formed/created by a first electronic device, e.g., web server, personal computer, user equipment, etc., transmitted across one or more communication networks, and received and processed by a second electronic device, e.g., personal computer, laptop computer, cellular telephone, WLAN device, or WWAN device. In creating the multimedia content, the first electronic device obtains/retrieves multimedia content from a video camera or from a storage device, for example, and encodes the multimedia content to create encoded audio and video frames according to a standard format, e.g., Quicktime, (motion picture expert group) MPEG-2, MPEG-4, or H.264, for example. The encoded audio and video frames are placed into data packets that are sequentially transmitted from the first electronic device onto a servicing communication network, the data packets addressed to one or more second electronic device(s). The sequentially transmitted sequence of encoded audio/video frames may be referred to as an audio/video stream. One or more communication networks carry the data packets to the second electronic device. The second electronic device receives the data packets, reorders the data packets if required, and extracts the encoded audio and video frames from the data packets. A decoder of the second electronic device decodes the encoded audio and/or video frames to produce audio and video data. The second electronic device then stores the video/audio data and/or presents the video/audio data to a user via a user interface.

The audio/video stream typically traverses a number of differing types of communication networks, e.g., LANs, WANs, the Internet, WWANs, WLANs, one or more cellular networks, etc. Some of these networks may not support the audio/video stream reliability and/or with sufficient data rate, resulting in poor quality audio/video at the second electronic device. In particular, wireless networks have limited throughput shared by multiple users and can suffer from environmental conditions that interfere with wireless transmissions. Nonetheless, these wireless networks are called upon to support high bandwidth usage video streaming.

DETAILED DESCRIPTION OF THE DRAWINGS

Figure 1:
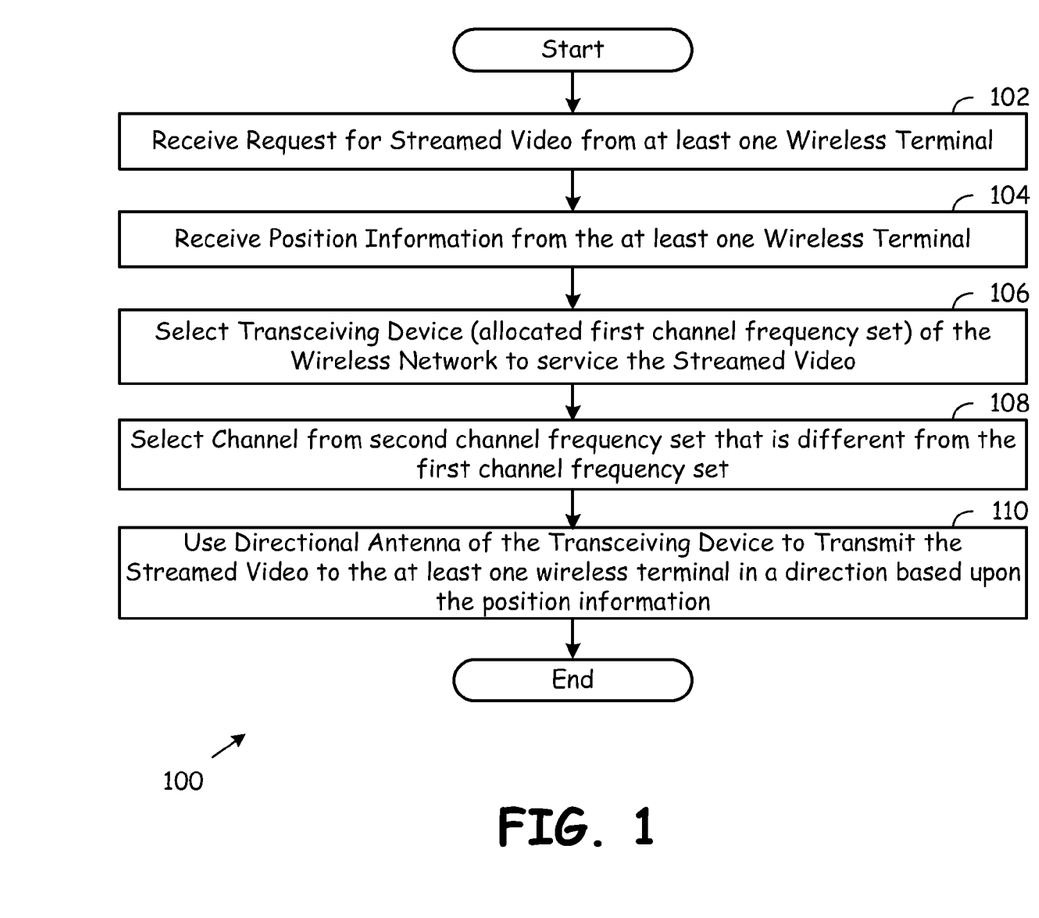
FIG. 1 is a flow chart illustrating operations for delivering streamed video (and audio) to at least one wireless terminal according to one or more embodiments of the present disclosure.

FIG. 1 is a flow chart illustrating operations for delivering streamed video (and audio) to at least one wireless terminal according to one or more embodiments of the present disclosure. The operations 100 of FIG. 1 commence with a wireless transceiving device, e.g., base station, access point, etc., of a wireless network receiving a request for streamed video from at least one wireless terminal (Step 102). Such request may come from a single wireless terminal or from multiple wireless terminals. The request may come via single transceiving device or via multiple transceiving devices of the wireless network. Operation continues with the transceiving device of the wireless network receiving position information from the at least one wireless terminal requesting streamed video (Step 104). Next, the wireless network (a wireless transceiving device itself in some operations) selects a transceiving device of the wireless network to service transmission of the streamed video to the at least one wireless terminal (Step 106).

According to the operations 100 of FIG. 1, the selected transceiving device is allocated a first channel frequency set of a channel frequency reuse pattern within the wireless network. The channel frequency reuse pattern of the wireless network to which the transceiving device is constrained may be a static allocation selected according to system engineering parameters. However, the channel frequency reuse pattern of the wireless network may change over time based upon system operating conditions such as signal propagation characteristics, system usage, and other engineering criterion.

Operation continues with the wireless network (wireless transceiving device) selecting a channel from a second channel frequency set that is different from the first channel frequency set (Step 108). According to the operation of Step 108, the transceiving device of the wireless network is not normally allocated channels of the second channel frequency set and any use of one or more channels of the second channel frequency set "violates" the channel frequency reuse pattern of the wireless network. However, for the particular operation of transmitting the streamed video to the at least one wireless terminal, the transceiving device is assigned a channel frequency from the second channel frequency set in a manner that "violates" the frequency reuse pattern of the wireless network. Operation continues with the transceiving device using a directional antenna to transmit the streamed video to the at least one wireless terminal using the assigned channel (Step 110). The streamed video is transmitted in a direction based upon the position information received from the at least one wireless terminal at Step 104 using the channel of the second channel frequency set selected/assigned at Step 108.

The wireless network may be a cellular communication wireless network, a Wireless Local Area Network (WLAN), a Wireless Wide Area Network (WWAN), or another wireless network. When the wireless network is a cellular communication network, for example, the wireless network may operate according to a cellular communication standard such as one or more of the Global Standards for Mobile communications (GSM) operating standards, one or more Code Division Multiple Access (CDMA) operating standards, one or more Time Division Multiple Access (TDMA) operating standards, and/or a combination of these. When the wireless network operates according to a WLAN operating standard, the wireless network may operate consistently with one or more of the IEEE 802.11x operating standards. When the wireless network operates according to a wireless wide area network operating standard, the wireless network may operate consistent with the Worldwide Interoperability for Microwave Access (WiMAX) operating standards.

According to various aspects of the operations of Step 104, position information received by the wireless network from the at least one wireless terminal may include Global Positioning System (GPS) coordinates. In such case, the GPS coordinates received will be respect to the wireless terminals transmitting such GPS coordinates. When the coordinates of the wireless terminals differ from one another, the directionality and relative width of the directional transmissions made at Step 110 are set according to the multiple differing GPS coordinates. According to another aspect of the present disclosure, the wireless network, via a transceiving device, may send a position information request to the at least one wireless terminal prior to receipt of the position information from the at least one wireless terminal.

According to other operations of the present disclosure, the wireless transceiving device operating on the selected channel of the second channel frequency set will make transmissions at Step 110 in order to minimize interference with other wireless transceiving devices that are allocated channels within the second channel frequency set according to the channel frequency reuse pattern. One technique for minimizing such interference is to coordinate in time transmissions of the streamed video by the transceiving device with transmissions of other transceiving devices of the wireless network on the same channel. Another technique for minimizing interference is to temporarily remove availability of the selected channel from other transceiving devices within the wireless network. In such case, the selected channel is temporarily reassigned from another neighboring or adjacent transceiving device to the subject transceiving device in order to service the video/audio stream.

Still another technique for minimizing interference between the transceiving device that transmits the streamed video to the at least one wireless terminal and with another transceiving device using a common channel is to control transmit power of the transmitted streamed video by the transceiving device. The control of transmit power of the transceiving device in transmitting the video stream may differ from normal transmit power control within the wireless network. For example, in cellular networks, available transmit power of wireless transceiving devices is typically fully allocated among serviced wireless terminals. According to the present disclosure, a technique may be employed wherein the transmit power of the streamed video is based upon a received quality of the streamed video by one of the (a most poorly receiving) wireless terminals of the plurality of wireless terminals receiving the streamed video. In such case, a decoder of one or more of the wireless terminals receiving the streamed video may report decoding quality to the transceiving device of the wireless network. Based upon the decoding quality of the wireless terminal(s), the transceiving device may increase or decrease the transmit power of the streamed video to the wireless terminal(s) receiving the streamed video. This operation, although perhaps inconsistent with standardized operations of a cellular network, may help to reduce interference caused by the transceiving device in other cells to which the selected channel is allocated and operational. Other techniques employed may simply include having a plurality of wireless terminals receiving the streamed video each report received signal quality to the transceiving device. The signal quality may simply be used as an indicia of a transmit power level at which the streamed video should be transmitted directionally by the transceiving device according to Step 110 of FIG. 1.

Figure 2:
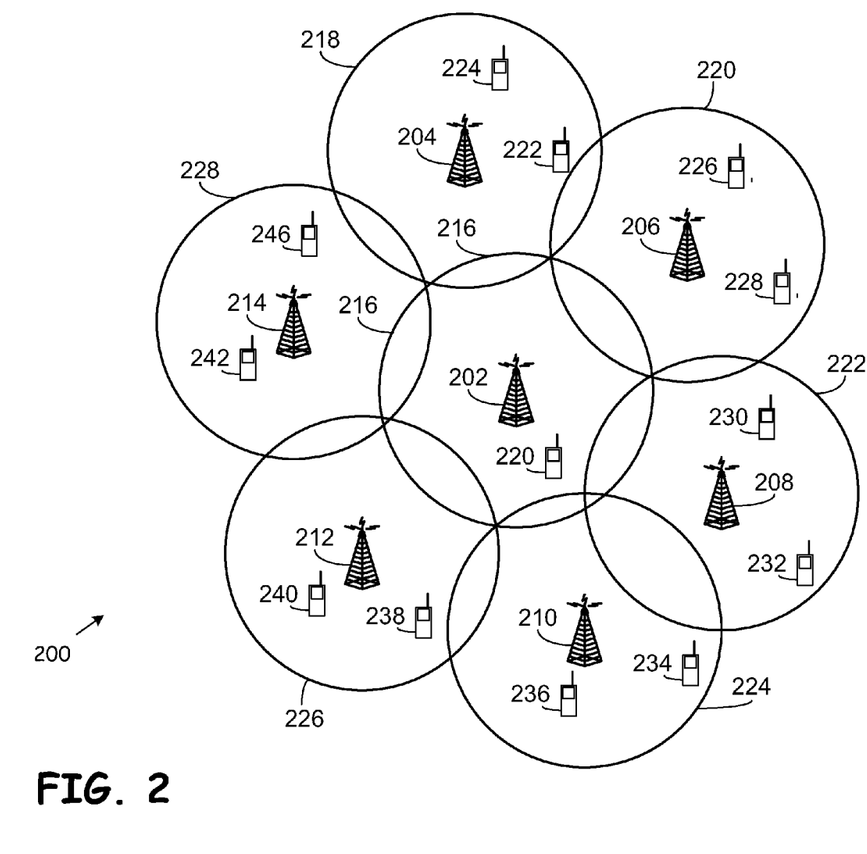
FIG. 2 is a system diagram illustrating a wireless network servicing a plurality of wireless terminals according to one or more embodiments of the present disclosure.

FIG. 2 is a system diagram illustrating a wireless network servicing a plurality of wireless terminals according to one or more embodiments of the present disclosure. Illustrated in FIG. 2 are a plurality of transceiving devices 202, 204, 206, 208, 210, 212, and 214. Each of these transceiving devices 202-214 may be a cellular base station. Alternately, each of these transceiving devices 202-214 may be a wireless access point (WAP) of a WLAN or of a WWAN. Each of the plurality of transceiving devices 202-214 is allocated a first channel frequency set of a channel frequency reuse pattern of the wireless network 200. Each of the transceiving devices 204-214 supports a respective service coverage area 216-228. While these service coverage areas 216-228 are illustrated simply as circular areas, the service coverage areas of the transceiving devices 202-214 will vary in size and shape based upon the manner in which the wireless network 200 is engineered. Each of the plurality of transceiving devices 202-214 within the respective service coverage areas 216-228 services at least one wireless terminal. These wireless terminals are referred generally via numerals 220-246. While the structure and appearance of these wireless terminals 220-246 is illustrated simply as a handheld device, each of these wireless terminals 220-246 could be another type of wireless terminals such as a wirelessly enabled notebook computer, a wirelessly enabled desktop computer, a wirelessly enabled PDA, or another type of wirelessly enabled device capable of communicating with one or more of the transceiving devices 202-214 of the wireless network 200. The structure of a wireless transceiving device will be described in some detail with reference to FIG. 7 while the structure of a wireless terminal will be described in some detail with reference to FIG. 8.

According to one or more embodiments of the present disclosure, one or more of the transceiving devices 202-214 operates consistently with the operations 100 of FIG. 1. In doing so, during normal operations, the transceiving devices service most communications according to a set channel frequency reuse pattern. However, the streamed video communications of the present disclosure are serviced by "violating" this channel frequency reuse pattern as was described with reference to FIG. 1 and as will be described further hereinafter with reference to FIGS. 3-9.

Figure 3:
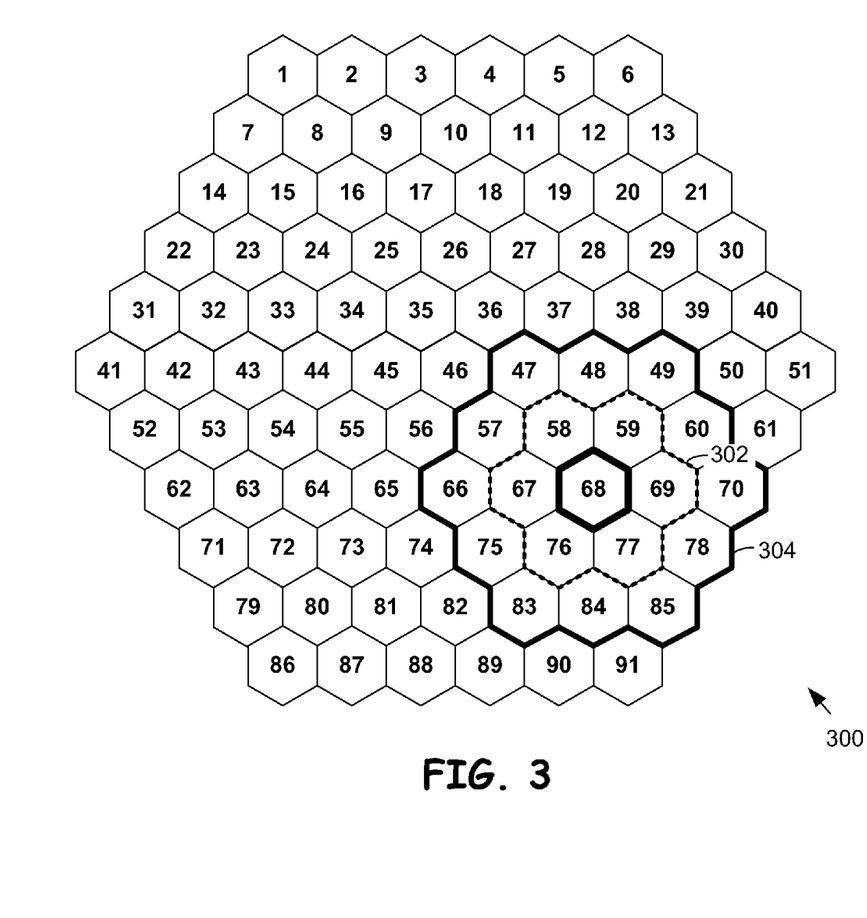
FIG. 3 is a diagram illustrating frequency reuse criterion that may be employed according to one or more embodiments of the present disclosure.

FIG. 3 is a diagram illustrating frequency reuse criterion that may be employed according to one or more embodiments of the present disclosure. A wireless network 300 operating according to embodiments of the present disclosure includes cells referred to via numerals 1-91. Each of these cells 1-91 is serviced by at least one transceiving device of the wireless network 300. In a first set of operations, each of the transceiving devices of the wireless network corresponding to the plurality of cells 1-91 is allocated a corresponding channel frequency set of a channel frequency reuse pattern of the wireless network 300. Such channel frequency reuse pattern of the wireless network 300 is established to avoid intercell interference on common channels and adjacent channels across the wireless network 300. Referring to subject cell 68, the cell 68 is assigned a first channel frequency set of the channel frequency reuse pattern. Neighboring cells to cell 68, which include cells 58, 59, 69, 77, 76 and 67, are assigned differing channel frequency sets of the channel frequency reuse pattern. Further, cells identified by numeral 304 that surround the cells identified as 302, which include cells 47, 48, 49, 60, 70, 78, 85, 84, 83, 75, 66, and 57, may be assigned a third channel frequency set of the channel frequency reuse pattern that differs from both the first channel frequency set and the second channel frequency set. The allocation of these channels within the wireless network 300 is performed in order to avoid intercell interference among adjacent (neighbor cells) and in some cases between cells that are adjacent to neighbor cells.

According to the present disclosure, cell 68 is allocated the first channel frequency set in order to avoid intercell interference with neighboring cells and cells adjacent to neighboring cells. In a second set of operations according to the present disclosure, the transceiving device corresponding to cell 68 uses a selected channel from a second channel frequency set that differs from its allocated first channel frequency set to transmit streamed video to at least one wireless terminal. Because operations according to the present disclosure may cause inter-cell interference, the transceiving device of cell 68 transmits the streamed video to the at least one wireless terminal in a direction based upon positions of the wireless terminals as reported by the wireless terminals. These aspects of the present disclosure will be described further with reference to FIGS. 5 and 6. However, in any case, the operations of the present disclosure in "violating" the channel frequency reuse pattern must be carefully employed to avoid system operational degradation.

Figure 4:
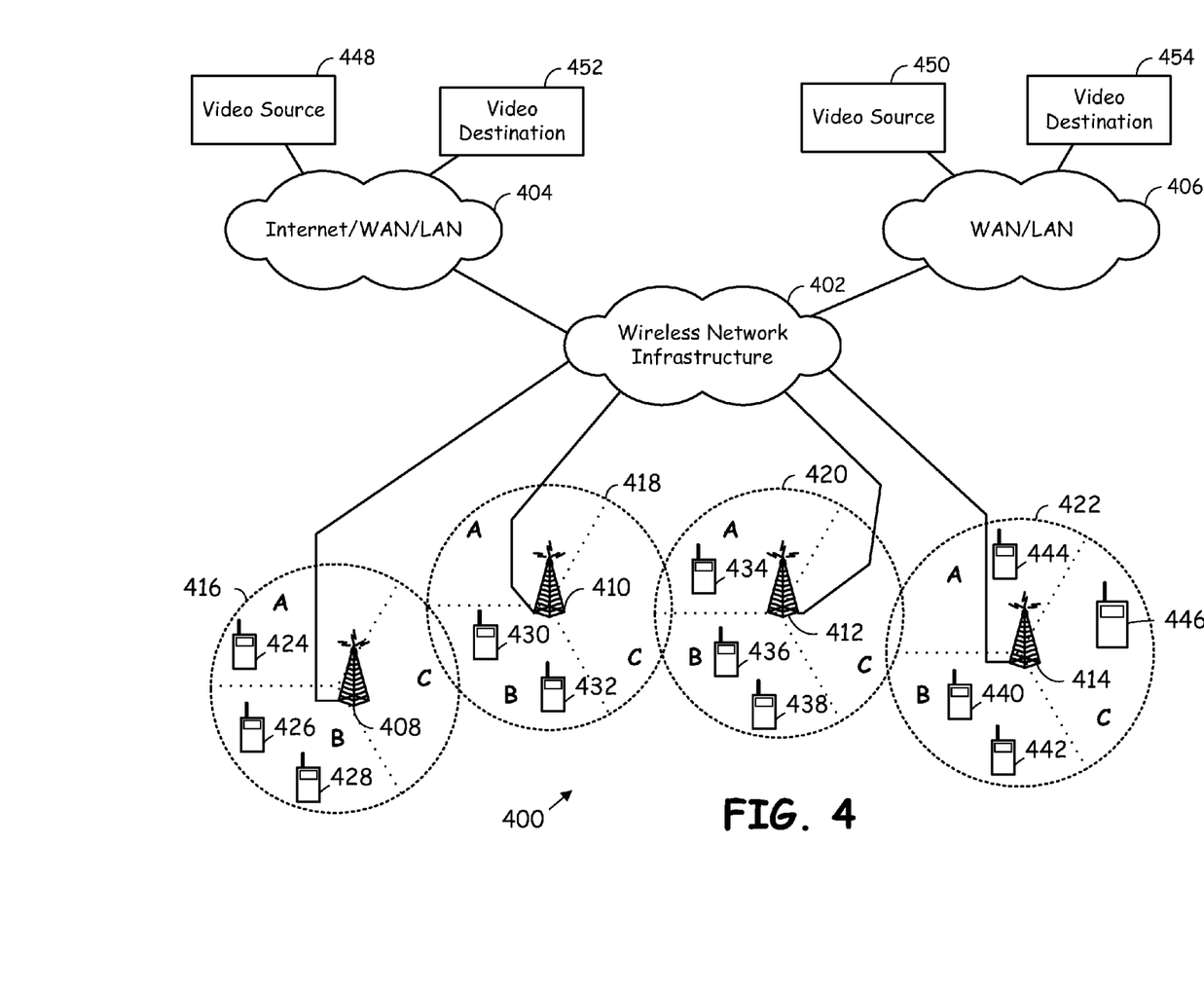
FIG. 4 is an abbreviated system diagram illustrating a wireless network constructed and operating according to one or more embodiments of the present disclosure.

FIG. 4 is an abbreviated system diagram illustrating a wireless network constructed and operating according to one or more embodiments of the present disclosure. The wireless network 400 includes a wireless network infrastructure 402 communicatively coupled to a plurality of transceiving devices 408, 410, 412, and 414. The plurality of transceiving devices 404-414 services cells/coverage areas 416, 418, 420, and 422, respectively. Transceiving device 408 services communications with wireless terminals 424, 426, and 428. As shown, transceiving device 408 supports sectorized transmissions in sectors A, B, and C. Transceiving device 410 also supports communications within respective sectors A, B, and C for wireless terminals 430 and 432. Likewise, transceiving device 412 supports communications within corresponding sectors A, B, and C with wireless terminals 434, 436, and 438. Finally, transceiving device 414 supports sectorized communications in sectors A, B, and C with wireless terminals 440, 442, 444, and 446.

The wireless network infrastructure 402 may be packet switched, circuit switched, or a combination of packet switched and circuit switched infrastructure. The structure of wireless network infrastructure 404 may be consistent with one or more standardized communication operating protocols. Coupled to wireless network infrastructure 402 are the Internet/WAN/LAN, or another type of network 404. A video source 448 and a video destination 452 couple to Internet/WAN/LAN 404. The video source 448 may be a source of streamed video (and audio) ultimately delivered by the wireless network 400 to a one or more of the wireless terminals 424-444. Video destination 452 may receive video produced by one or more of the wireless terminals 424-444.

Also coupled to wireless network infrastructure 402 is a WAN/LAN 406 that couples to a video (and audio) source 450 and a video destination 454. The video source 450 may be the source of the streamed video transmitted to one or more of the wireless terminals 424-444 serviced by wireless network 400. Wireless network 400 of FIG. 4 may operate according to the operations 100 of FIG. 1. Further, the wireless terminals 424-444 serviced by wireless network 400 of FIG. 4 may operate according to the operations 900 of FIG. 9 that will be described further herein.

Figure 5:
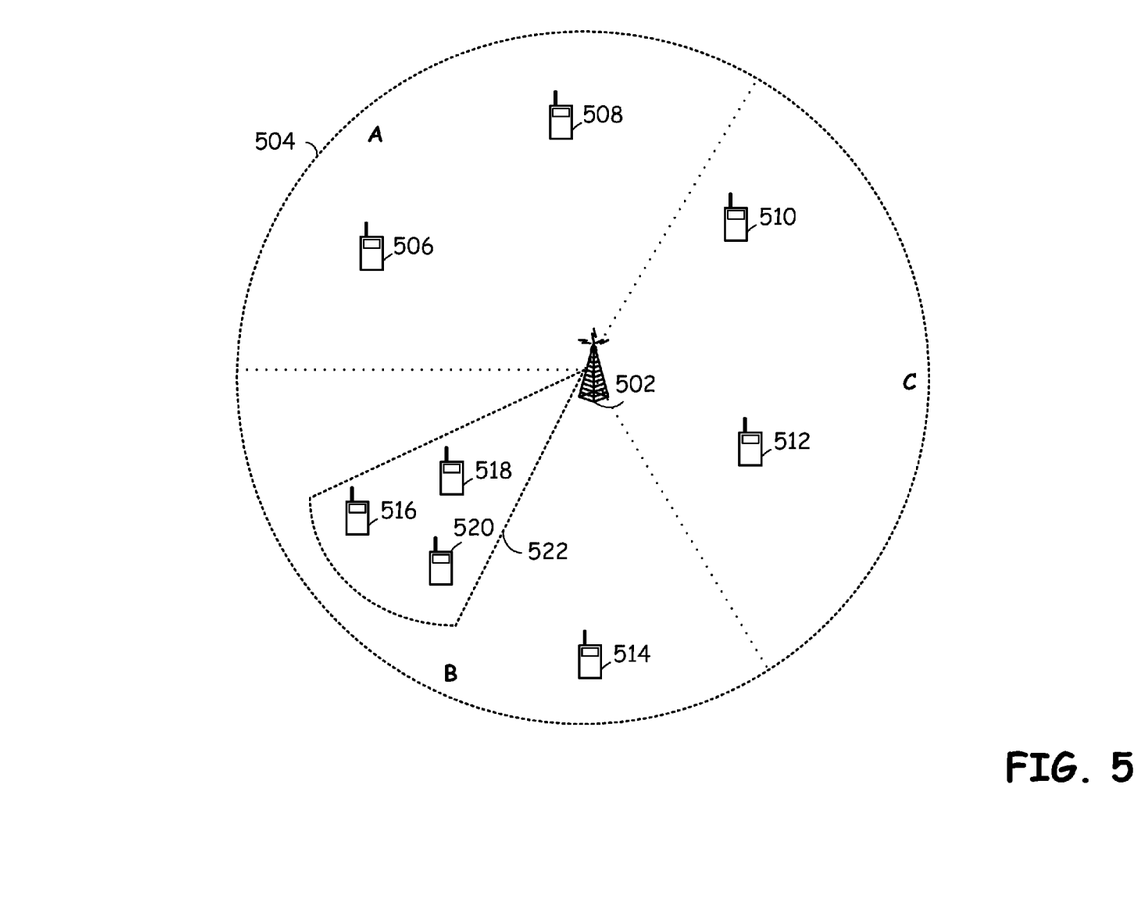
FIG. 5 is a diagram illustrating a service area of a transceiving device of a wireless network operating according to one or more embodiments of the present disclosure.

FIG. 5 is a diagram illustrating a service area of a transceiving device of a wireless network operating according to one or more embodiments of the present disclosure. A service coverage area 504 is sectorized into sectors A, B, and C and is serviced by transceiving device 502. In a first set of operations according to the present disclosure, transceiving device 502 services communications with at least one wireless terminal using a first channel frequency set of a channel frequency reuse pattern of the wireless network. Thus, the transceiving device 502, in some operations, uses differing channels in each of sectors A, B, and C. In such case, transceiving device 502 services communications with the wireless terminal 506 and 508 within sector A using a first channel of the first channel frequency set. Further, transceiving device 502 services communications with wireless terminals 510 and 512 within sector C using a second channel of the first channel frequency set. Finally, in the first set of operations, the transceiving device 502 services communications with wireless terminal 514 within sector B using a third channel of the first channel frequency set.

According to the present disclosure, in a second set of operations, the transceiving device 502 services the transmission of streamed video to wireless terminals 516, 518, and 520 on a selected channel of a second channel frequency set that is different from the first channel frequency set. As is generally shown, a transmission envelope 522 indicates that the transceiving device 502 directionally transmits the streamed video to wireless terminals 516, 518, and 520 in a direction based upon position information provided by the wireless terminals 516, 518, and 520 previously. The transmission envelope 522 illustrated in FIG. 5 is shown to have transmit power sufficient to service the transmission of the streamed video to the wireless terminals 516, 518, and 520 but not to have transmit power that is greater than required. In such case, because the selected channel used to transmit the streamed video to wireless terminals 516, 518, and 520 conflicts with channels used by adjacent cells or by next further neighbor adjacent cells, interference on the selected channel is minimized. In determining a directionality to transmit the streamed video to the wireless terminals 516, 518, and 520, the position information was previously received from the wireless terminals 516, 518, and 520. This position information is used by a transceiving device 502 in order to configure its directional antenna for transmission of the streamed video.

Figure 6:
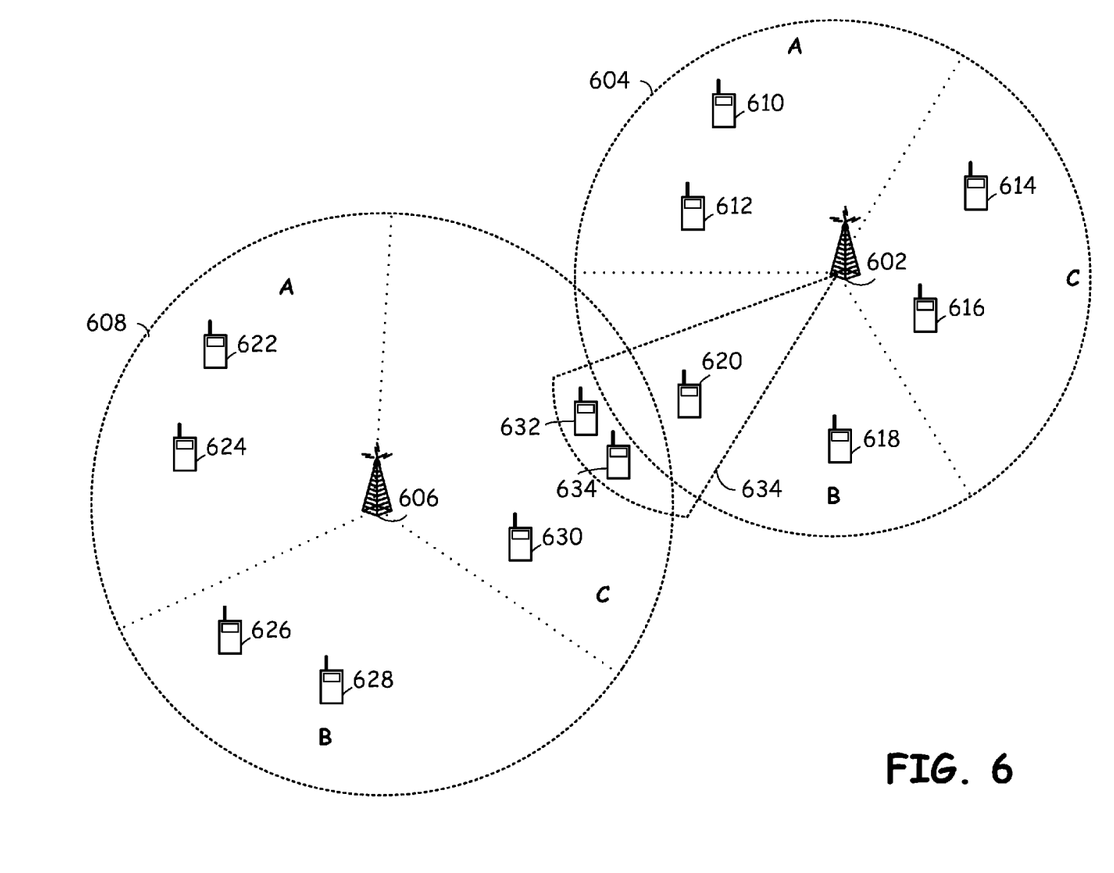
FIG. 6 is a diagram illustrating multiple transceiving devices of a wireless network operating according to one or more embodiments of the present disclosure.

FIG. 6 is a diagram illustrating multiple transceiving devices of a wireless network operating according to one or more embodiments of the present disclosure. Transceiving devices 602 and 606 of the wireless network service cells 604 and 608, respectively. Communications within each of these cells 604 and 608 are sectorized into sectors A, B, and C. Because cells 604 and 608 are adjacent, the transceiving devices 602 and 606 are allocated differing channel frequency sets of a channel frequency reuse pattern.

According to a first set of operations according to embodiments of the present disclosure, transceiving device 602 services wireless terminals 610, 612, 614, 616, and 618 using channels of the first channel frequency set. Likewise, transceiving device 606 services communications with the wireless terminals 622, 624, 626, 628, and 630 using channels of an allocated channel frequency set that differs from the first channel frequency set allocated to transceiving device 602.

According to a second set of operations of the present disclosure, the wireless network, transceiving device 602 or transceiving device 606, receives, from wireless terminal 620, 632, and 634, a request to transmit streamed video to the wireless terminals. These requests may be received via the wireless network from transceiving devices other than the transceiving devices 602 and 606. The transceiving devices 602 and 606 may send requests for location information to wireless terminal 620, 632, and/or 634 that prompt the wireless terminals to report their position information. In response thereto or along with a request to receive the streamed video, the transceiving devices 602 and 606 receive the position information from the wireless terminals 620, 632, and 634. Based upon the received position information, the wireless network, which would typically include other transceiving devices, selects or determines the transceiving device that will service the transmission of the streamed video to the wireless terminals 620, 632, and 634. This determination is made based upon the position information that is received from wireless terminal 620, 632, and 634 and may be further based upon other operating characteristics within the wireless network. These other operating characteristics may include the current loading of the transceiving devices 602 and 606, predetermined criterion for favoring transceiving devices of 602 and 606, or other criterion that would make the servicing of the streamed video preferable for one of the transceiving devices 602 or 606.

Then, based upon this determination, transceiving device 602 directionally transmits the streamed video to the wireless terminal 620, 632, and 634 on a selected channel from a second channel frequency set that is different from the first channel frequency set. The transmission, as indicated by transmission envelope 634, is made using transmit power sufficient to service the streamed video and without unduly causing inter-cell interference within the wireless network. As is illustrated in FIG. 6, the transmission envelope 634 represents a directional transmission from transceiving device 602 that corresponds to the reported position information of wireless terminals 620, 632, and 634.

Figure 7:
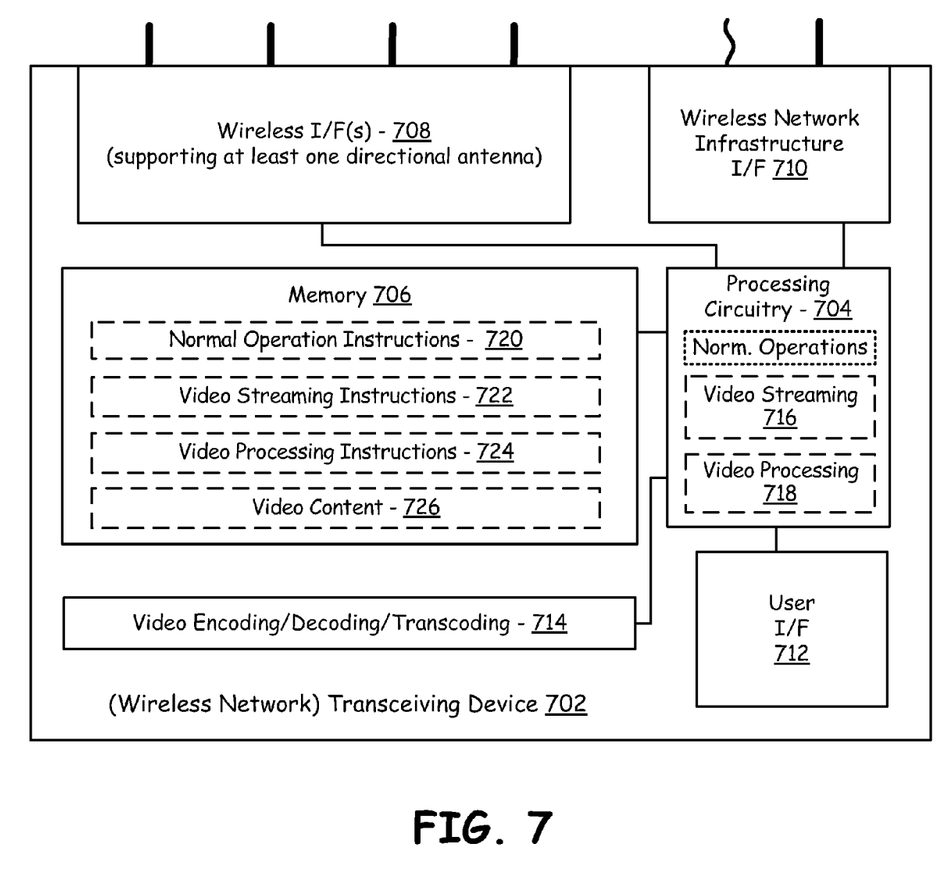
FIG. 7 is a block diagram illustrating a transceiving device of a wireless network constructed according to one or more embodiments of the present disclosure.

FIG. 7 is a block diagram illustrating a transceiving device of a wireless network constructed according to one or more embodiments of the present disclosure. The (wireless network) transceiving device 702 includes processing circuitry 704, memory 706, one or more wireless interfaces 708, one or more wireless network infrastructure interfaces 710, and a user interface 712. The processing circuitry 704 may be one or more of a microprocessor, a digital signal processor, an application specific integrated circuit, dedicated processing circuitry, or other processing circuitry that is capable of executing instructions based upon programs logic. Memory 706 may be any type of memory capable of storing digital information including data and instructions. Such memory 706 may be random access memory, read-only memory, hard disk drive memory, optical memory, or another type of memory.

The wireless interface(s) 708 may support a single operating standard, e.g. a WLAN standard, a WWAN standard, a cellular standard, or may support a plurality of communication standards. The wireless interface 708 supports at least one directional antenna coupled thereto to produce the directional transmission of streamed video to one or more wireless terminals. The wireless network infrastructure interface 710 couples the wireless network transceiving device to a servicing wireless network infrastructure such as wireless network infrastructure 402 illustrated in FIG. 4. The wireless network infrastructure interface 710 may include wired and/or wireless interface components. For example, when the transceiving device 702 is a WLAN device, it may simply couple via wireless network to other components of the wireless network infrastructure. Further, when the transceiving device 702 is a cellular base station, the wireless network infrastructure interface 710 may service a microwave communication link with other components of the wireless network infrastructure.

The transceiving device 702 operates consistently with the structures and operations previously illustrated with reference to FIGS. 1-6. In order to support such functionality, the processing circuitry 704 performs normal operations, video streaming operations 716 and may perform video processing operations 718. The memory 706 supports these operations of the transceiving device 702 by storing instructions, including normal operation instructions 720, video streaming instructions 722, and video processing instructions 724. The memory 706 may also store video content 726. The instructions and data stored in memory 706 is accessed by processing circuitry 704 to support the operations of the present disclosure in streaming video to wireless devices.

The transceiving device 702 may include dedicated processing circuitry to support operations according to embodiments of the present disclosure and other operations. The dedicated processing circuitry may include video encoding circuitry, decoding circuitry, and video transcoding circuitry 714. While this circuitry is referenced via a single numeral and showed as a single block, such circuitry may be subdivided into differing functional blocks in the wireless network transceiving device 702. User interface 712 may include interfaces to a monitor, a user input device such a key board and a mouse, and/or other components a user may employ to interact with the wireless network transceiving device 702.

Figure 8:
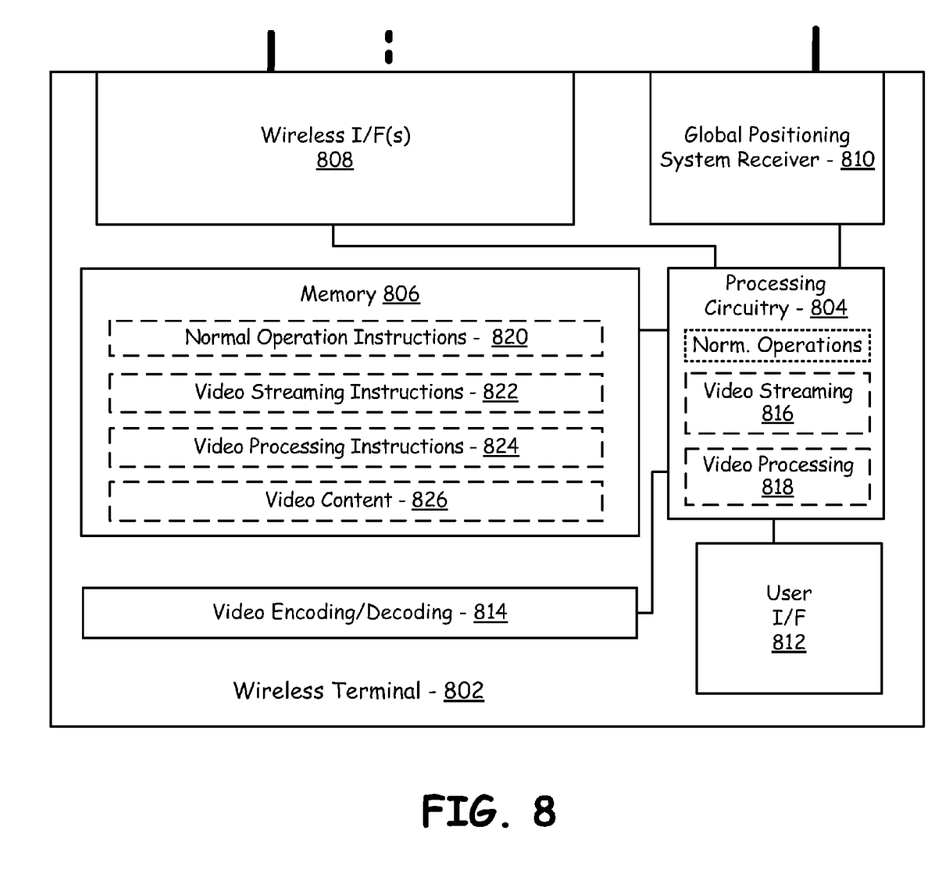
FIG. 8 is a block diagram illustrating a wireless terminal constructed according to one or more embodiments of the present disclosure.

FIG. 8 is a block diagram illustrating a wireless terminal constructed according to one or more embodiments of the present disclosure. The wireless terminal 802 includes processing circuitry 804, memory 806, one or more wireless interfaces 808, a Global Positioning System (GPS) receiver 810, a user interface 812, and video encoding/decoding circuitry 814. The processing circuitry 804 may be any type of processing circuitry that supports the operations of the present disclosure by execution of instructions and processing of digital information. The processing circuitry may be specialized, generalized, or a combination of specialized and generalized circuitry. The processing circuitry 804 supports normal operations apart from the present disclosure. The processing circuitry 804 supports the operations of the present disclosure relating to video streaming 816 and video processing 818.

Memory 806 may be any type of memory that is capable of storing and producing digital information. Examples of memory 806 and processing circuitry 804 were previously described with reference to FIG. 7 with reference to a transceiving device 702. Similar or same types of components enabling memory 806 and processing circuitry 804 may be employed with the wireless terminal 802. In accomplishing operations of the present disclosure, memory 806 stores normal operation instructions 802, video streaming instructions 822, and video processing instructions 824. Memory 806 may also store video content 826 that is produced based upon the received streamed video and subsequently processed. Video content 826 may be retrieved for later presentation to a user via the user interface 812. The user interface 812 may include a display, audio interface, user input interface, and other known or anticipated user interface devices. Dedicated video encoding/decoding circuitry 814 may perform video processing operations according to the present disclosure for the creation of streamed video and for the receipt and processing the streamed video to create video content 826.

The wireless interfaces 808 may include one or more cellular interfaces, one or more WLAN interfaces, one or more WWAN interfaces and/or one or more Wireless Personal Area Network (WPAN) interfaces. The GPS receiver 810 may be conventional and is employed according to the present disclosure to determine a current position of the wireless terminal 802. Further operations of the wireless terminal 802 that has not been previously described via reference to FIGS. 1-7 are described further with reference to FIG. 9.

Figure 9:
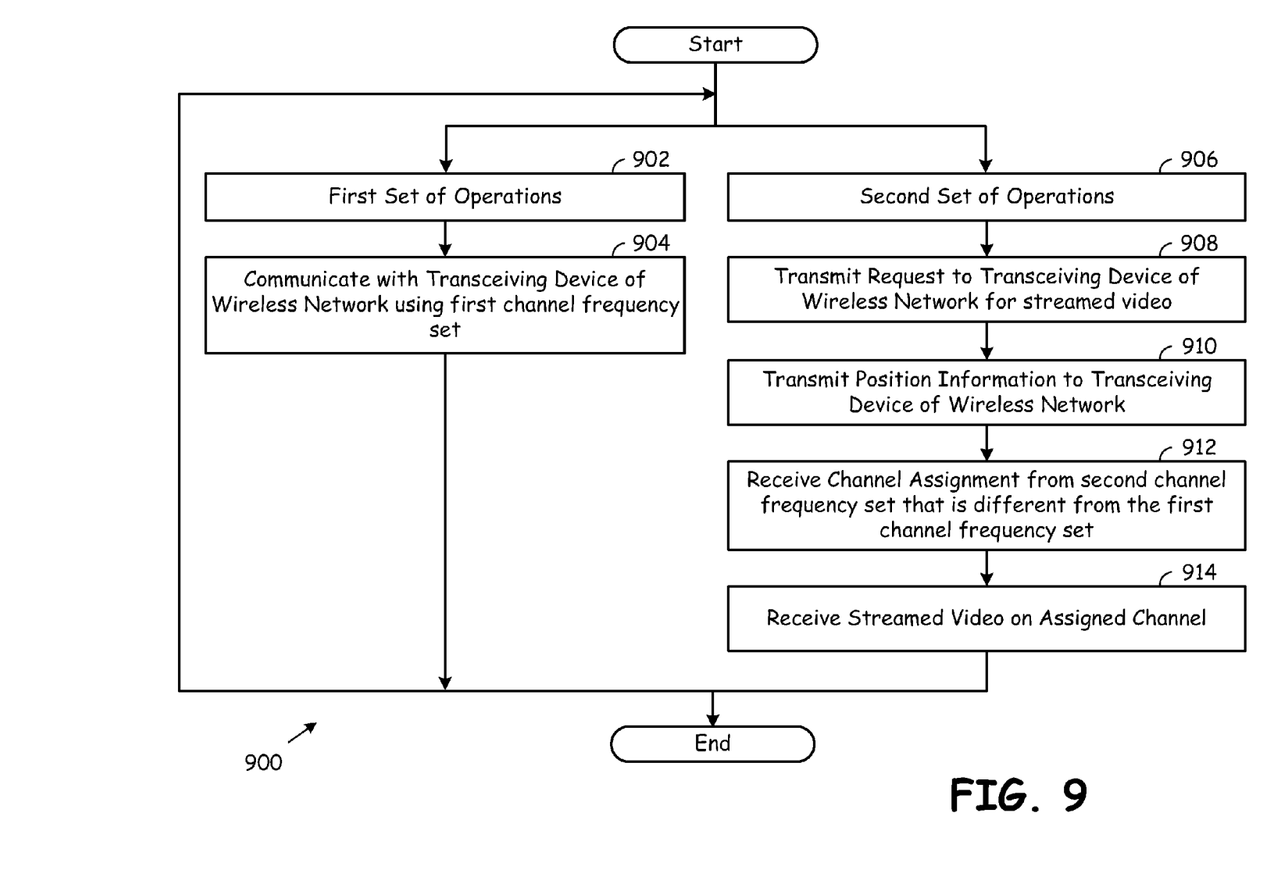
FIG. 9 is a flow chart illustrating operations of a wireless terminal according to one or more embodiments of the present disclosure.

FIG. 9 is a flow chart illustrating operations of a wireless terminal according to one or more embodiments of the present disclosure. The operations 900 of FIG. 9 may be employed by any of the various wireless terminals previously described with reference to FIGS. 1-8 herein. Operation 900 of FIG. 9 commences with performing a first set of operations (Step 902) and/or a second set of operations (Step 906). Interaction between the first set of operations 902 and the second set of operations 906 may be completely separate or may be overlapping. For example, a wireless terminal may concurrently execute the first set of operations 902 and the second set of operations 906 to service both normal communications with a wireless network and the receipt of streamed video from the wireless network. Thus, even though Steps 902-914 and Steps 906-914 are shown separately, these steps may be performed concurrently by a wireless terminal with the present disclosure.

With the first set of operations 902, the wireless terminal communicates with the transceiving device with the wireless network using a first channel frequency set (Step 904). This first channel frequency set used in Step 904 is consistent with the channel frequency reuse pattern of a wireless network within which the wireless terminal operates. As was previously described, in the second set of operations, a channel is selected for the streaming of video from a second channel frequency set that is different from the first channel frequency set. Thus, when the first set of operations 902-904 are performed concurrently with the second set of operations 906-914, the wireless terminal may be communicating with a transceiving device on channels of differing channel frequency sets of the channel frequency reuse pattern.

With the second set of operations 906, the wireless terminal transmits a request to a transceiving device of the wireless network for streamed video (Step 908). Concurrently with the request for the streamed video or subsequently in response to a request from the transceiving device of the wireless network, the wireless terminal transmits its position information to a transceiving device of the wireless network (Step 910). This position information may be determined based upon access of the GPS receiver of the wireless terminal. Operation continues with the wireless terminal receiving a channel assignment from the second channel frequency set that is different from the first channel frequency set (Step 912). Then, operation continues with the wireless terminal receiving the streamed video from the transceiving device of the wireless network on the assigned channel (Step 914). From Step 914 or Step 904, operation may return to either or both of the first set of operations 902 or 906.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

The present disclosure has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed disclosure.

The present disclosure has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed disclosure. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present disclosure has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed disclosure.

Moreover, although described in detail for purposes of clarity and understanding by way of the aforementioned embodiments, the present disclosure is not limited to such embodiments. It will be obvious to one of average skill in the art that various changes and modifications may be practiced within the spirit and scope of the disclosure, as limited only by the scope of the appended claims.

The invention claimed is:

1. A method for communication with at least one wireless terminal by a wireless network, the wireless network having a channel frequency reuse pattern, the method comprising:
   receiving position information from the at least one wireless terminal, the position information corresponding to a location within the channel frequency reuse pattern of the wireless network;
   selecting a channel in contradistinction to the channel frequency reuse pattern of the wireless network for a transceiving device within the wireless network to service transmission of a signal to the at least one wireless terminal; and
   transmitting the signal from the transceiving device to the at least one wireless terminal using the selected channel.

2. The method of claim 1, further comprising:
   using a directional antenna of the transceiving device to transmit the signal from the transceiving device to the at least one wireless terminal in a direction based upon the position information.

3. The method of claim 2, wherein receiving position information from the at least one wireless terminal comprises receiving Global Positioning System (GPS) coordinates from the at least one wireless terminal.

4. The method of claim 2, further comprising sending a position information request to the at least one wireless terminal.

5. The method of claim 1, further comprising coordinating in time the transmitting of the signal with communications serviced by a differing transceiving device of the wireless network to reduce interference between communications on the selected channel.

6. The method of claim 1, further comprising controlling transmit power of the transmitted signal to reduce interference with communications on the selected channel serviced by at least one differing transceiving device of the wireless network.

7. The method of claim 6, wherein:
   the at least one wireless terminal comprises a plurality of wireless terminals; and
   controlling transmit power of the transmitted signal to reduce interference with communications on the selected channel serviced by a differing transceiving device is based upon feedback received regarding received signal quality of the signal from the plurality of wireless terminals.

8. The method of claim 1, wherein the at least one wireless terminal comprises a plurality of terminals and the signal is transmitted to the plurality of terminals.

9. A transceiving device of a wireless network for communicating with at least one wireless terminal, the wireless network having a channel frequency reuse pattern, the transceiving device comprising:
 a communication interface including at least one wireless interface, the communication interface servicing communication with the at least one wireless terminal and with other wireless network devices; and
 processing circuitry coupled to the wireless interface and operable to:
  receive position information via the communication interface from the at least one wireless terminal, the position information corresponding to a location within the channel frequency reuse pattern of the wireless network;
  select a channel in contradistinction to the channel frequency reuse pattern to service transmission of a signal to the at least one wireless terminal; and
  transmit, via the communication interface, the signal to the at least one wireless terminal using the selected channel.

10. The transceiving device of claim 9, wherein the processing circuitry is further operable to:
 directionally transmit the signal to the at least one wireless terminal in a direction based upon the position information.

11. The transceiving device of claim 10, wherein the position information comprises Global Positioning System (GPS) coordinates of the at least one wireless terminal.

12. The transceiving device of claim 10, wherein the processing circuitry is further operable to transmit via the communication interface a position information request to the at least one wireless terminal.

13. The transceiving device of claim 9, wherein the processing circuitry is further operable to coordinate in time the transmitting of the signal with communications serviced by a differing transceiving device of the wireless network to reduce interference between communications on the selected channel.

14. The transceiving device of claim 9, wherein the processing circuitry is further operable to control transmit power of the transmitted signal to reduce interference with communications on the selected channel serviced by at least one differing transceiving device of the wireless network.

15. The transceiving device of claim 14, wherein:
 the at least one wireless terminal comprises a plurality of wireless terminals; and
 the control of transmit power of the transmitted signal to reduce interference with communications on the selected channel serviced by a differing transceiving device is based upon feedback received regarding received signal quality of the signal from the plurality of wireless terminals.

16. The transceiving device of claim 9, wherein the at least one wireless terminal comprises a plurality of terminals and the signal is transmitted to the plurality of terminals.

17. A portable electronic device for communicating with a transceiving device of a wireless network, the wireless network having a channel frequency reuse pattern, the portable electronic device comprising:
 a communication interface; and
 processing circuitry coupled to the communication interface, the processing circuitry operable to:
  transmit position information via the communication interface to the transceiving device of the wireless network;
  receive a channel assignment, including a selected channel that is in contradistinction to the channel frequency reuse pattern, to receive transmission of a signal from the transceiving device; and
  receive via the communication interface the signal using the selected channel.

18. The portable electronic device of claim 17, wherein the processing circuitry is further operable to transmit the position information via the communication interface to the transceiving device of the wireless network in response to a position information request received from the transceiving device via the communication interface.

19. The portable electronic device of claim 18, further comprising a Global Positioning System (GPS) receiver operable to determine the position information.

20. The portable electronic device of claim 17, wherein the processing circuitry is further operable to receive a position information request from the transceiving device via the communication interface.

* * * * *